United States Patent [19]

Metzger

[11] Patent Number: 5,782,145
[45] Date of Patent: Jul. 21, 1998

[54] PROCESS FOR THE FABRICATION OF A MULTI-BLADE TOOL

[76] Inventor: Karl Metzger, Wiesenstr. 68, Albstadt, Germany, D-72461

[21] Appl. No.: 640,739

[22] PCT Filed: Aug. 2, 1995

[86] PCT No.: PCT/DE95/01006

§ 371 Date: Jul. 8, 1996

§ 102(e) Date: Jul. 8, 1996

[87] PCT Pub. No.: WO96/07504

PCT Pub. Date: May 14, 1996

[30] Foreign Application Priority Data

Sep. 6, 1994 [DE] Germany .................. 44 31 756.5
Dec. 8, 1994 [DE] Germany .................. 44 43 736.6

[51] Int. Cl.$^6$ .................. B23B 51/02; B23P 15/32
[52] U.S. Cl. .................. 76/108.6; 76/108.1
[58] Field of Search .................. 76/108.1, 108.6; 408/210; 175/395

[56] References Cited

U.S. PATENT DOCUMENTS

| | | | |
|---|---|---|---|
| 319,027 | 6/1885 | Robin | 76/108.6 |
| 430,792 | 6/1890 | Taft | 76/108.6 |
| 714,890 | 12/1902 | Gieshoidt | 76/108.6 |
| 893,162 | 7/1908 | Hackett | 76/108.6 |
| 968,472 | 8/1910 | Hardsocg | 76/108.6 |
| 972,155 | 10/1910 | Brown | 76/108.6 |
| 2,533,227 | 12/1950 | Delaney | 76/108.6 |
| 3,555,935 | 1/1971 | Dorrenberg | 76/108.6 |
| 3,608,400 | 9/1971 | Mortsen | 76/108.6 |
| 3,991,454 | 11/1976 | Wale | 76/108.1 |
| 4,887,496 | 12/1989 | Kobayashi | 76/108.1 |
| 4,913,737 | 4/1990 | Nakamura et al. | 76/108.6 |
| 5,020,394 | 6/1991 | Nakamura et al. | 76/108.6 |
| 5,074,025 | 12/1991 | Willard, III | 76/108.6 |
| 5,116,659 | 5/1992 | Glatzle et al. | 76/108.6 |

FOREIGN PATENT DOCUMENTS 0 173 675 A1  3/1986  European Pat. Off.
0 361 189 A1  4/1990  European Pat. Off.

*Primary Examiner*—Hwei-Siu Payer
*Attorney, Agent, or Firm*—Evenson, McKeown, Edwards & Lenahan, P.L.L.C.

[57] ABSTRACT

A process for fabricating a multi-blade tool out of high strength tool steel and the tool fabricated therewith. The present invention is distinguished by the following steps. Initially, a profile, the cross section of which corresponds to the cross section of the to-be-fabricated multi-blade tool, is made by hot extrusion. Then, the profile is twisted at a temperature higher than room temperature, however, below the departure temperature of the extruded profile, via a plurality of roller units.

13 Claims, 4 Drawing Sheets

PROCESS FOR THE FABRICATION OF A MULTI-BLADE TOOL

DESCRIPTION

TECHNICAL FIELD

The present invention relates to a process for the fabrication of a multi-blade tool as well as to the multi-blade tool fabricated therewith itself.

STATE OF THE ART

Today multi-blade tools, such as e.g., drills, are fabricated in a material and time consuming manner.

In order to reduce the material consumption required by the fabrication of drilling tools, such as described in EP 0 361 189 Al, a masonry drilling tool composed of a head, a shaft having an extraction screw surface and a central reinforcement in the tool axis and fastening taps has been developed. The shaft having an extraction screw surface is formed by a twisted flat rod having in the axis of the drill tool a reinforcement measuring crosswise two to three times the thickness of the flat rod.

The object of the invention in the cited European patent is to create a drilling tool which will, in particular, due to greater stability and longer service life improve the quality of the boreholes. Moreover, less material consumption makes these more economical.

However, this document does not state how to minimize material consumption and thereby minimize the cost of fabricating a multi-blade tool by, e.g., using a flat profile as feedstock in order to be able to utilize the drill tool in working with steel and other metals.

DESCRIPTION OF THE INVENTION

The object of the present invention is to provide a process for fabricating a multi-blade tool which permits fabricating multi-blade tools with minimal material consumption and minimal cost.

This object is solved by providing a process for fabricating a multi-blade tool, said tool having an axis of rotation, said process comprising the steps of: hot extruding a profile having a cross section which corresponds to an untwisted cross section of the tool; and twisting at least a portion of said profile about said axis of rotation via at least two sets of rollers, each of said sets of rollers being spaced apart from each other along a longitudinal axis coaxial with said axis of rotation of said tool, each said set of rollers comprising at least two rollers, said rollers of each said set of rollers being spaced apart from each other radially with respect to said longitudinal axis to define a space therebetween corresponding to a twisted cross section of the tool.

The invented process for fabricating a multi-blade tool permits non-cutting fabrication of semi-finished products having a tool shaping profile. In particular, the drills can be completely made of a high alloy HSS steel, such as e.g., material No. 1.3343 or the like. As the invented process does not require working a drill out of solid material but rather uses "flat material", the saving of material is high, about 50 to 75%. The developed process ensures that blade geometry and helical pitch can be produced with little tolerance. Solid profiles or profiles having at least one borehole preferably a central passage of any shape can be used as feedstock. The passage may be employed for feeding a coolant respectively a lubricant or for holding the tool shaft.

Fabricated cutting tools may be, e.g., drills, mills, reamers, etc. Especially preferred is using the invented process for making drills having a large diameter of 30 millimeter or more.

A particular advantage of the invented process is much quicker fabrication of special blade tools from freely selectable basic profiles. The tool can be quickly and easily reground to shaping or multi-step drills.

The process for fabricating a multi-blade tool out of high strength tool steel is carried out according to the following steps: a profile having a cross section corresponding to the to-be-fabricated multi-blade tool is produced by warm extruders and then the profile is twisted, in particular, without cooling down to room temperature.

It is feasible to process the profile to produce the blades prior to twisting.

Especially preferred is, however, that the lateral blades for making a transverse chamfer are processed following twisting and tempering. Accordingly it is preferred to also process the tip of the tool after twisting.

In another preferred embodiment, the profile is twisted after extrusion using mangle rolls.

According to the invention it is advantageous to employ a profile having an approximately S-shaped cross section for fabricating a two-blade drill.

The multi-blade tool fabricated according to the present invention can be composed, at the end of the shaft, of a flat profile having a rectangular cross section, with a gripping element being attached at the end piece to hold the drill in a conventional machine seat. Such a "universal gripping clamp" is completely independent of the respective systems into which the multi-blade tool is to be inserted. The basis of such a gripping element is a floating and auto-centering holding means.

The end piece, thus the seat, is always a round-ground neck, the form being dependent on the respective extruded profile twisted with the prescribed pitch.

Significant for the user is that tools designed in such a manner according to the present invention do not have to be previously reduced to other conus systems, i.e. tools designed according to the present invention are approximately 50% shorter while having the same drilldepth performance. The result is not only considerable saving of material, but rather it also considerably increases the operating possibilities of the utilized machines.

Due to the open profile, the blade can be processed using conventional grinding machines as there is no geometric collision. Tools can therefore be processed in situ so that special tools, such as stepped tools, can be fabricated.

The mentioned tools can be individually adapted to the processing criteria. The HSS profiles can be mounted at any time with high-velocity cutting materials, e.g., with tempered metal, ceramics and others. The steel alloy of the profile permits coating with any mechanically resistant materials.

BRIEF DESCRIPTION OF THE DRAWINGS

The present invention is made more apparent by way of example in the following without the intention of limiting the overall inventive idea using preferred embodiments with reference to the accompanying drawings, to which explicitly is referred with reference to all invented details not explained in detail herein.

DESCRIPTION OF PREFERRED EMBODIMENTS

In the following figures, the same reference numbers stand for the same or corresponding parts obviating renewed introduction and only deviations from the first embodiment are described.

Figure 1:
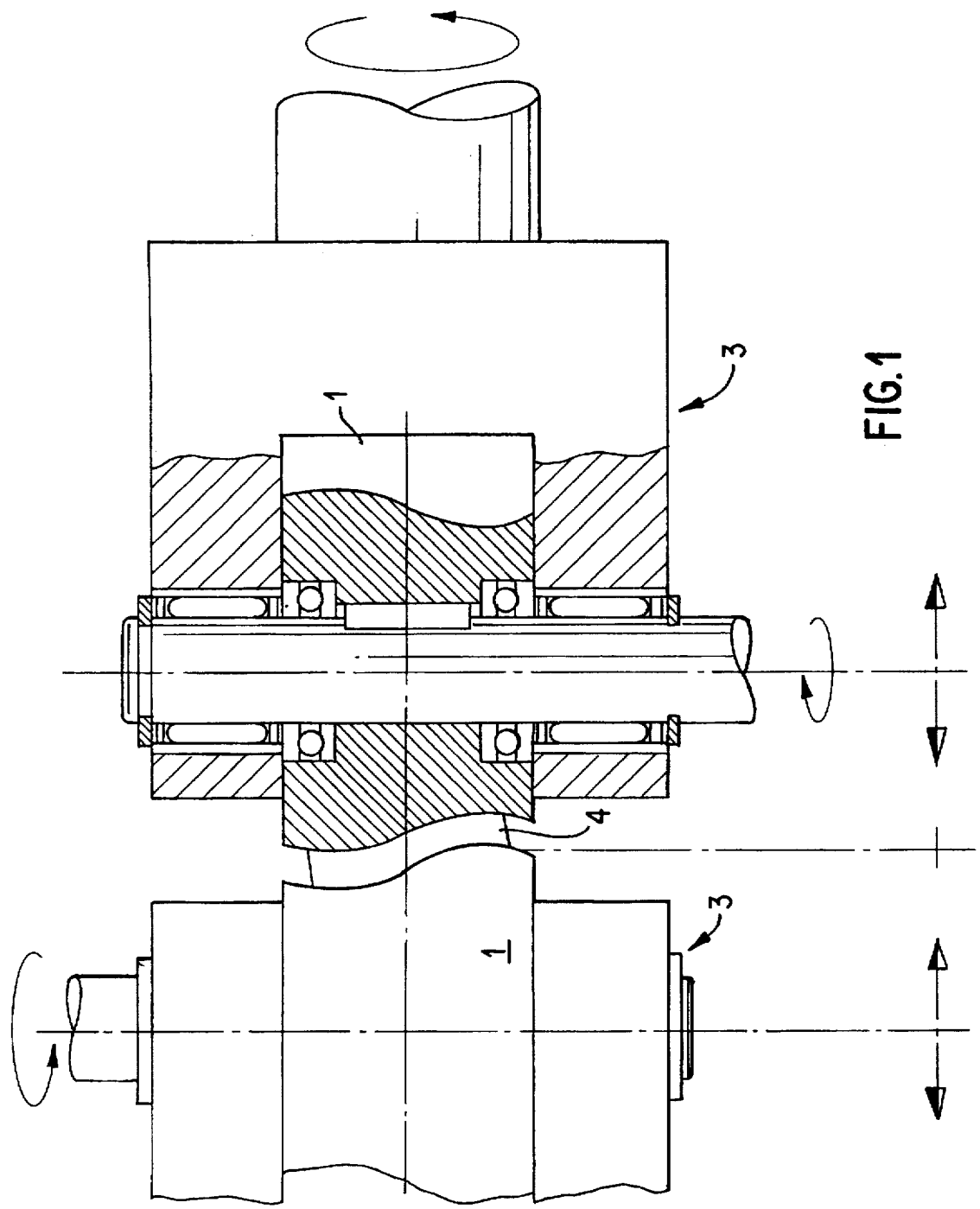
FIG. 1 shows a partially sectional view in an axial direction of a roller and calibration unit

The invented roller and calibration unit as shown in FIG. 1 comprises two roller units 3 each including a profile roller 1, which may be identical and disposed only off set at 180°. The desired spiral pitch is set via the manual axis of rotation Z. For instance, the spiral pitch can be raised rotating to the right and lowered rotating to the left. Both rollers 1 are disposed on a linear axis X and can be set individually.

The axis of rotation Y is driven and synchronously controlled via, e.g., servo motors. The r.p.m. of the used servo motors correlates with the departure velocity of the extruded profile.

Figure 2:
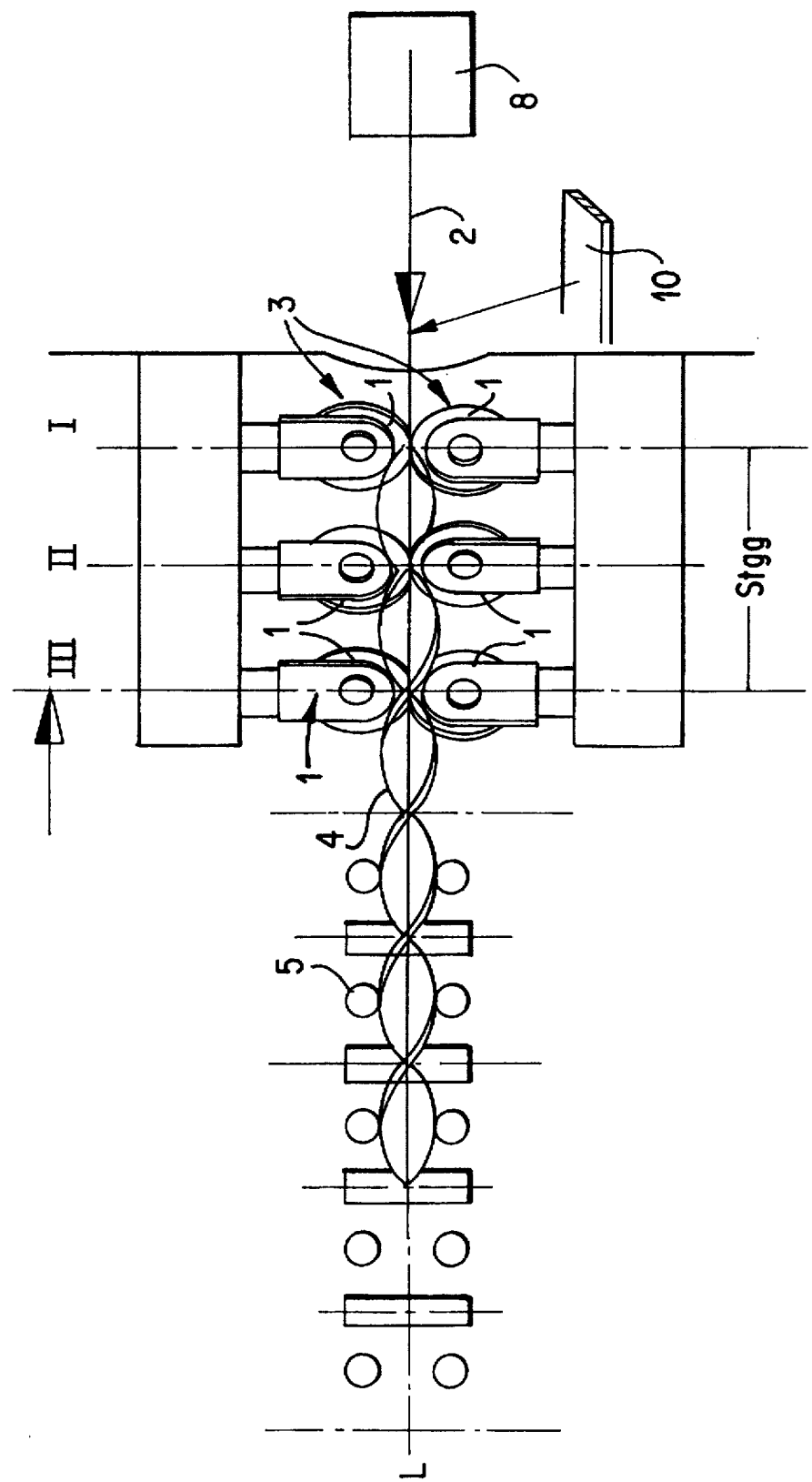
FIG. 2 shows a side view of a twisting and calibration device having three of the roller and calibration units of FIG. 1.

FIG. 2 shows a twisting and calibration device composed of three of the roller and calibration units I, II, III of FIG. 1. In the case of small profiles having tight pitches, e.g., it is possible to only use two units.

The twisting and calibration device is disposed immediately at the departure of profile 2 from an extruder 8. The profile 2 has a cross section which corresponds to an untwisted cross-section of the rod 4. The extruded profile 2 runs along a longitudinal axis L coaxial with an axis of rotation of the rod 4 into the first roller/calibration unit I. The profile 2 may have a flat rectangular cross section 10. Both roller units 3 can be set at the desired pitch angle and the desired roll depth. The upper and lower rollers 1 of each roller calibration unit are spaced part from each other radially with respect to the longitudinal axis L to define a space therebetween corresponding to a twisted cross section of the rod 4. As shown in FIG. 1, the cross section of the rod 4 may be S-shaped. As shown in FIG. 2, the axis of rotation X of the upper rollers 1 may be skewed with respect to the axis of rotation X of the lower rollers 1. This is accomplished by rotating the upper and lower roller units 3 in respectively opposite directions about axis Z. As shown in FIG. 2, the skewed axes of the upper and lower rollers 1 cause the profile 2 to be twisted into a helix profile rod 4. The driven rollers 1 draw work piece 2 through unit I. At this unit I, the twist is bent and roughed down.

The same procedure occurs in unit II. In this case, only the profile and the pitch are stabilized.

The dimensions and surface of the work piece are calibrated in unit III.

The helix profile rod 4 made in this manner runs into a roller conveyor. The roller conveyor 5 prevents the helix profile rod 4 from deforming.

The length of the resulting helix profile rod can be randomly fabricated according to rolling mill standards.

The tool is shaped advantageously when the material is hot, e.g., immediately following the extruding step at a temperature above an ambient air temperature and below a departure temperature of the extruded profile, thus at approximately 700° C. However, it is also possible to produce only a straight profile and to twist the extruded profile following cooling to room temperature and subsequent heating.

The manufactured helix profile rod 4, insofar as profile 2 is provided with already manufactured blades, does not have to be processed further, but rather only, insofar as desired, are cut to the correct length.

Figure 3:
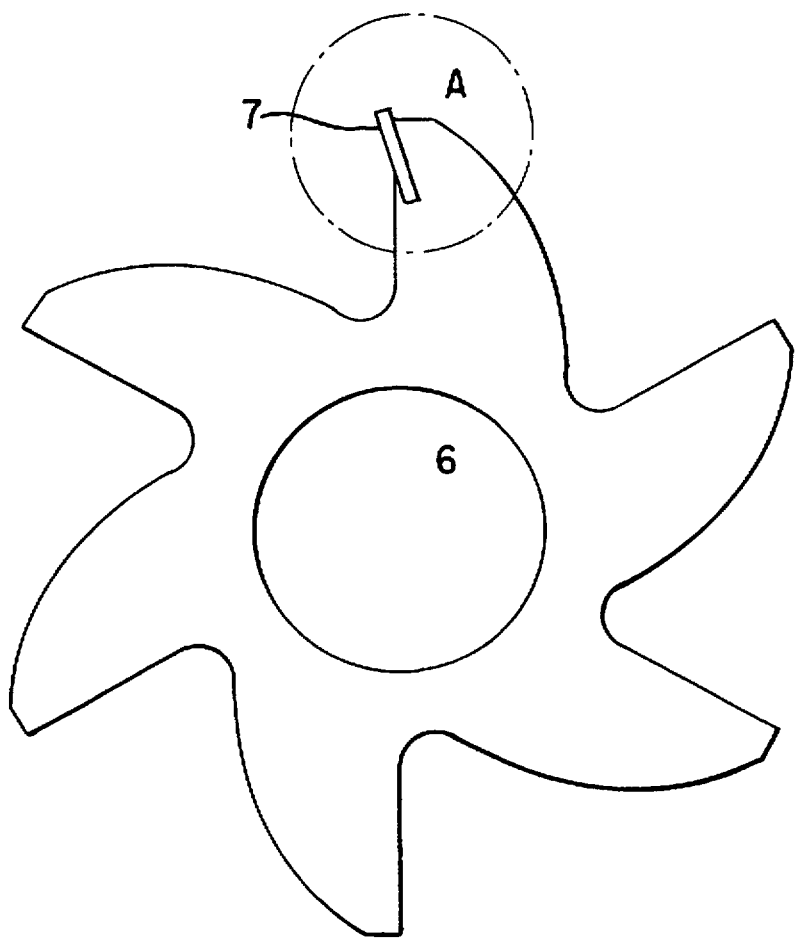
FIG. 3 shows a cross section of an invented tool having a central borehole.

FIG. 3 shows a cross section of an invented tool having a central borehole 6. The blades 7 may be provided with tempered metal or ceramic and they can, if made with tempered metal or ceramic, be attached using a welding as well as using a clamp procedure. These types of tools are preferred for working with wood and plastic.

Figure 4:
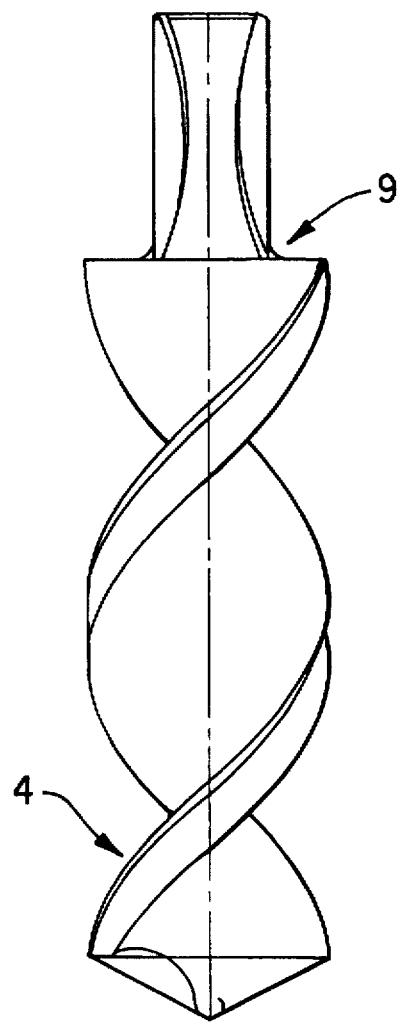
FIG. 4 shows a tool with a step.

FIG. 4 shows a multi-blade tool having an end piece with a smaller diameter than the rest of the profile to form a step 9. The end piece is configured to be attached to a gripping element of a standard holding system.

What is claimed is:

1. A process for fabricating a multi-blade tool, said tool having an axis of rotation, said process comprising the steps of:

hot extruding a profile having a cross-section which corresponds to an untwisted cross-section of the tool; and twisting at least a portion of said profile about said axis of rotation via at least two sets of rollers, each of said sets of rollers being spaced apart from each other along a longitudinal axis coaxial with said axis of rotation of said tool, each said set of rollers comprising at least two rollers, said rollers of each said set of rollers being spaced apart from each other radially with respect to said longitudinal axis to define a space therebetween corresponding to a twisted cross-section of the tool wherein said twisting step is conducted immediately following said hot extruding step.

2. A process according to claim 1, wherein said twisting step takes place at a temperature higher than 500° C.

3. A process according to claim 1, further comprising the step of calibrating said profile on a straightening bench having mangle rolls following the twisting step.

4. A process according to claim 1, further comprising the step of processing lateral blades for making a transverse chamfer following the twisting step.

5. A process according to claim 4, further comprising the step of processing said lateral blades with a blade geometry corresponding to a desired application of said multi-blade tool.

6. A process according to claim 1, wherein said profile has a front surface, and said process further comprises the step of processing said front surface, following the extruding step and the twisting step, according to a cutting application for said multi-blade tool.

7. A process according to claim 1, wherein said profile has an approximately S-shaped cross section and wherein said multi-blade tool is a two-blade drill.

8. A process according to claim 7, wherein said profile having said approximately S-shaped cross section is produced by extrusion.

9. A process according to claim 1, wherein each of said sets of rollers consists of a pair of rollers, and wherein an axis of rotation of a first of said pair of rollers is skewed with respect to an axis of rotation of a second of said pair of rollers in order to twist said profile into a spiral form.

10. A process according to claim 1, said hot extruding step is conducted at a temperature above an ambient air temperature and below a departure temperature of the extruded profile.

11. A multi-blade tool fabricated according to claim 1, wherein an end piece of the profile has a flat rectangular cross section and wherein said end piece is configured to be attached to a gripping element of a conventional gripping device.

12. A multi-blade tool according to claim 11, wherein said end piece of the profile is processed to have a smaller diameter than the rest of said profile in such a manner that a step is created and wherein said end piece is configured to be attached to a gripping element of a standard holding system, said end piece being engageable by a gripping element having claws.

13. A multi-blade tool according to claim 11, wherein said profile has at least one axially-extending recess.

\* \* \* \* \*